United States Patent

[11] 3,530,884

| [72] | Inventor | Aaron Kutz |
| | | Forest Hills, New York |
| [21] | Appl. No. | 805,281 |
| [22] | Filed | March 7, 1969 |
| [45] | Patented | Sept. 29, 1970 |
| [73] | Assignee | Fluidic Controls Corporation |
| | | South Hackensack, New Jersey |
| | | a corporation of New Jersey |

[54] FLUID LOGIC MODULE
19 Claims, 12 Drawing Figs.

[52] U.S. Cl.................................................. 137/608,
137/81.5, 235/201(m.e.)
[51] Int. Cl...................................................... F16d 1/00,
F15c 3/00
[50] Field of Search............................................ 137/608,
625.69, 81.5; 251/367; 235/201(m.e.)

[56] References Cited

UNITED STATES PATENTS

| 2,834,368 | 5/1958 | Gray............................ | 251/367X |
| 2,985,181 | 5/1961 | Nixon.......................... | 235/201X |
| 3,057,376 | 10/1962 | Agutter et al................. | 251/367X |
| 3,244,193 | 4/1966 | Loveless...................... | 137/608X |
| 3,295,552 | 1/1967 | Powell et al.................. | 251/367X |
| 3,426,800 | 2/1969 | Bauer........................... | 137/608 |
| 3,465,774 | 9/1969 | Kautz et al.................... | 137/608X |
| 3,485,268 | 12/1969 | Salisbury...................... | 137/608 |

FOREIGN PATENTS

| 799,228 | 8/1958 | Great Britain................. | 137/608 |

Primary Examiner—Samuel Scott
Attorney—James and Franklin

ABSTRACT: A fluid logic module comprises two substantially similar valves each having a movable valve member and an input port for receiving a control signal. The valve system has an output port and a port for receiving a source signal. Each valve further includes at least one intercommunication port placed in preselected operative fluid communication with a corresponding intercommunication port formed in the other valve through a passage formed in a communication member interposed between the valves. The relative positions of the valve members, corresponding to the presence or absence of one or both of the control signals, either effects or prevents operative communication between selected ports in the valves to control the operative fluid communication between the source port and the output port as a predetermined logic function of the control signals.

Patented Sept. 29, 1970

INVENTOR
AARON KUTZ
BY James and Franklin
ATTORNEY

Patented Sept. 29, 1970

INVENTOR
AARON KUTZ

BY James and Franklin
ATTORNEY

Patented Sept. 29, 1970

INVENTOR
AARON KUTZ

BY James and Franklin
ATTORNEY

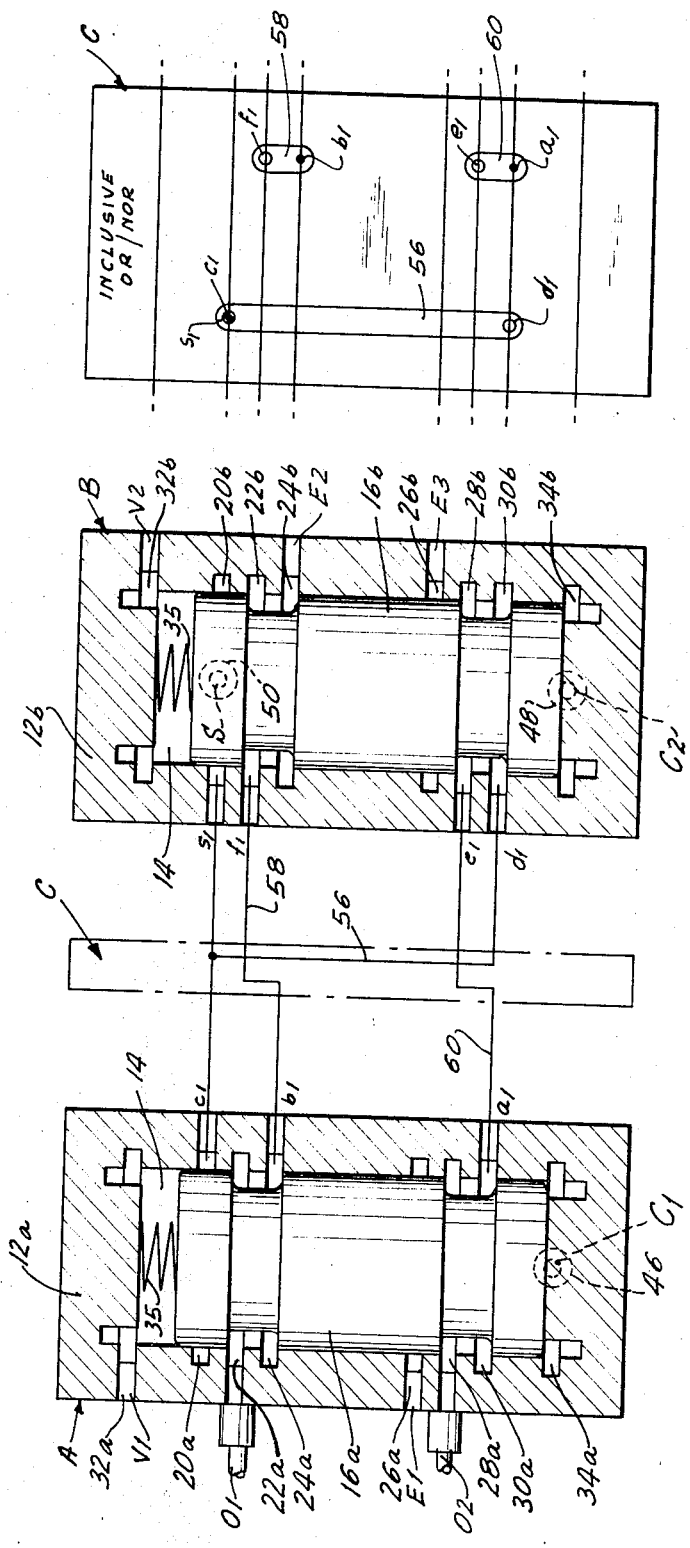

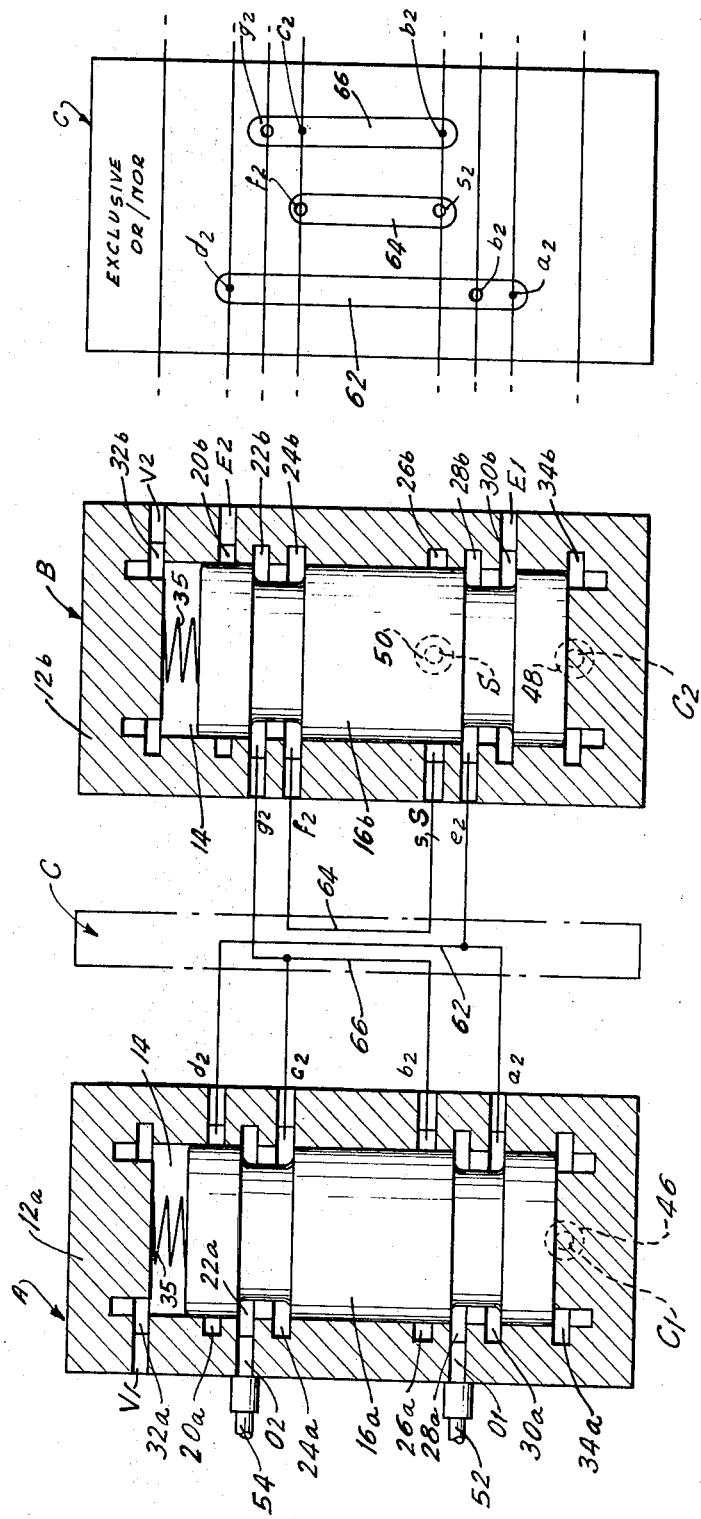

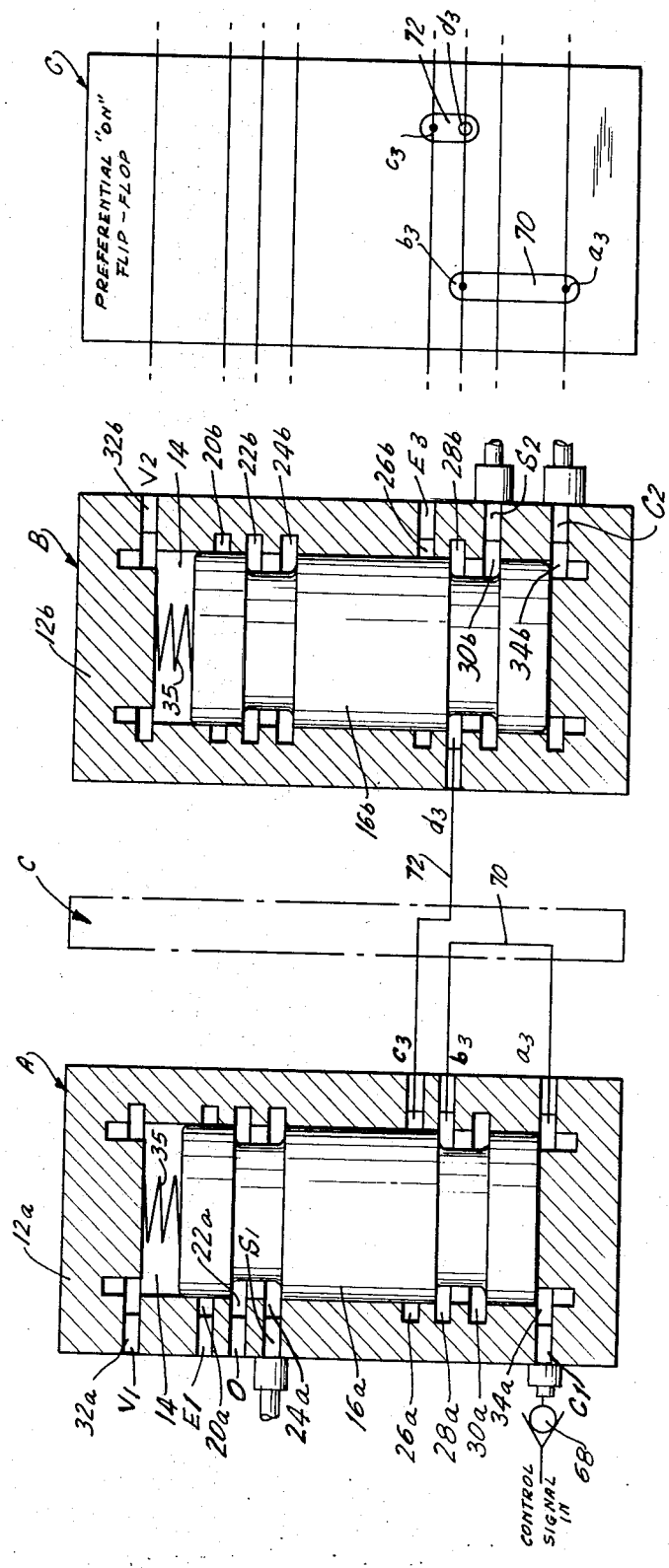

FLUID LOGIC MODULE

The present invention relates to logic modules, and particularly to a logic module which is controlled by fluid signals.

Fluid controlled logic has found widespread acceptance in the controlled operation of mechanical apparatus in which operation of at least one section of that apparatus is controlled by the presence or absence of fluid signals which may be either programmed into the apparatus or derived from other sections of that apparatus in accord with their operation. Logic assemblies capable of performing operations of this type are known. They are effective to control a relatively large fluid signal output in response to the presence or absence of a relatively small fluid signal so that an effective amplification as well as controlled logic operation of the apparatus may be obtained.

The basic building block of assemblies of this type commonly is in the form of a valve in which the valve member is controlled by a control signal selectively applied to an input terminal of the valve. In these logic modules, it is advantageous to perform a logic operation in response to two different control signals so that the output of the assembly is a predetermined logic function of these two control signals. That is, in typical operations of logic assemblies of this type, an output may be typically derived when either both of the control signals are present, or when they are both absent, or when one of the signals is absent and the other is present.

In the fluid logic assemblies as heretofore known, the valves had to be specially designed to perform the particular logic operation desired. That is, each of the valves used in the assembly had to be specially designed and separately machined to produce the desired logic operation. Also the interconnecting means between the ports of the individual valves had to be specially designed and fabricated by bending and shaping conduits in accord with the particular logic operation of the assembly in which it was to be used.

The requirements of the prior art fluid controlled assemblies for specially designed valves and interconnecting members greatly increase the cost of such assemblies, as well as the difficulty and time involved in their production, and has resulted in a limited industrial acceptance. It has heretofore not been practicable to employ standard type valves in these assemblies since these valves could not be readily modified to achieve any one of a number of logic operations commonly used in controlled machine operation.

It is thus an object of the present invention to provide a fluid controlled logic module in which two basically identical valves are employed which can be readily modified in accord with the desired logic operation of the module.

It is another object of the present invention to provide a fluid controlled logic module in which a pair of substantially identical valves are incorporated into a housing and in which a wide variety of logic operations can be performed by the module by proper selection of an essentially standardized member interposed between these valves, and by the proper and relatively simple formation of ports in the valve bodies.

It is still another object of the present invention to provide a fluid controlled logic module of the type described, in which the fabrication cost is reduced as a result of the standardization of the valves used therein, and in which the determination of the logic function of the module is effected by interposing a preselected communication member between facing surfaces of these valves, and by selectively forming ports in those facing surfaces, all in accord with the desired logic operation of the module.

To these ends, the present invention provides a fluid controlled logic module in which first and second basically identical valves are placed within a housing. Each valve comprises a valve body having a fluid chamber and an input port communicating with that chamber for receiving a control signal. One of the valves has a port formed therein for receiving a source signal and the other valve has a port defining an output port. Each of the valves has at least one intercommunication port formed therein and the module further comprises a communication member interposed between the valve bodies and having passages formed therein in communication with selected ones of the intercommunication ports formed in the valve bodies.

A valve member is provided in each of the valves and is movable, upon the presence or absence of a control signal at the valve input port, between first and second operative positions within the valve chamber, to effect selective communication between different ones of the ports in the valves. By a proper selection of the location of the output, source and intercommunication ports in the valves, as well as of the passages in the communication member, the movement of the valve members in each of the valves in response to the presence or absence of the control signals at the input ports of the valves controls the operative communication between the source port and the output port in a manner corresponding to the desired logic function of the module. Thus, an output signal will be produced at the output port only when the control signals are either absent or present in predetermined ones of their possible permutations, so that the signal at the output port is a predetermined logical consequence of the state of the control signals.

The relative location of the various ports will differ depending on the logic function to be attained. In some, but not all, instances one of the valves has first and second output ports, the source port being provided in the other of the valves. Only one output port may be used in some instances, in which case the source port is either in or out of communication with the output port depending upon the presence or absence of the control signals at the input ports of each valve. When two output ports are provided the source port is in alternate operative communication with one or the other of the output ports depending upon the control signals. The presence of the source signal at the first output port may correspond to a true output logic signal, and the presence of an output signal at the second output port may correspond to the complement of that logic signal.

Each of the intercommunication ports of a given valve preferably terminate at a common surface on the valve body, these surfaces of the two valves facing one another. The communication member is interposed between these facing surfaces so that the passages provided therein effect communication between selected ones of the intercommunication ports within a single valve, and/or between intercommunication ports in the two valves.

Several fluid controlled logic modules incorporating features of the present invention, each capable of performing a predetermined logic operation, are specifically described herein. These include modules providing an exclusive OR/NOR, an inclusive OR/NOR, and an AND/NAND function, as well as a preferential flip-flop having a starting state output "on" and a preferential flip-flop having a starting state output "off". These specific logic modules are shown for purposes of illustrating various possible logic functions which may be performed by the fluid logic module of the present invention, but the utility of the invention is not limited to the specific logic functions illustrated.

To the accomplishment of the above, and to such other objects as may hereinafter appear, the present invention relates to a fluid logic module, as defined in the accompanying claims and as described in this specification, taken together with the accompanying drawings in which:

FIG. 7 is a view similar to FIG. 2 of a second embodiment of the logic module of the present invention to produce an inclusive OR/NOR logic function;

FIG. 8 is a plan view of the communication member utilized in the logic module of FIG. 7;

FIG. 9 is a view similar to that of FIGS. 2 and 7 and illustrating yet another embodiment of the logic module of the present invention to produce an exclusive OR/NOR function;

Fig. 10 is a plan view of the communication member utilized in the logic module of FIG. 9:

FIG. 11 is a view similar to FIGS. 2, 7 and 9 illustrating a further modification of the logic module of the present invention to produce a preferential flip-flop logic function; and Fig. 12 is a plan view of the communication member utilized in the logic module of FIG. 11.

Figure 1:
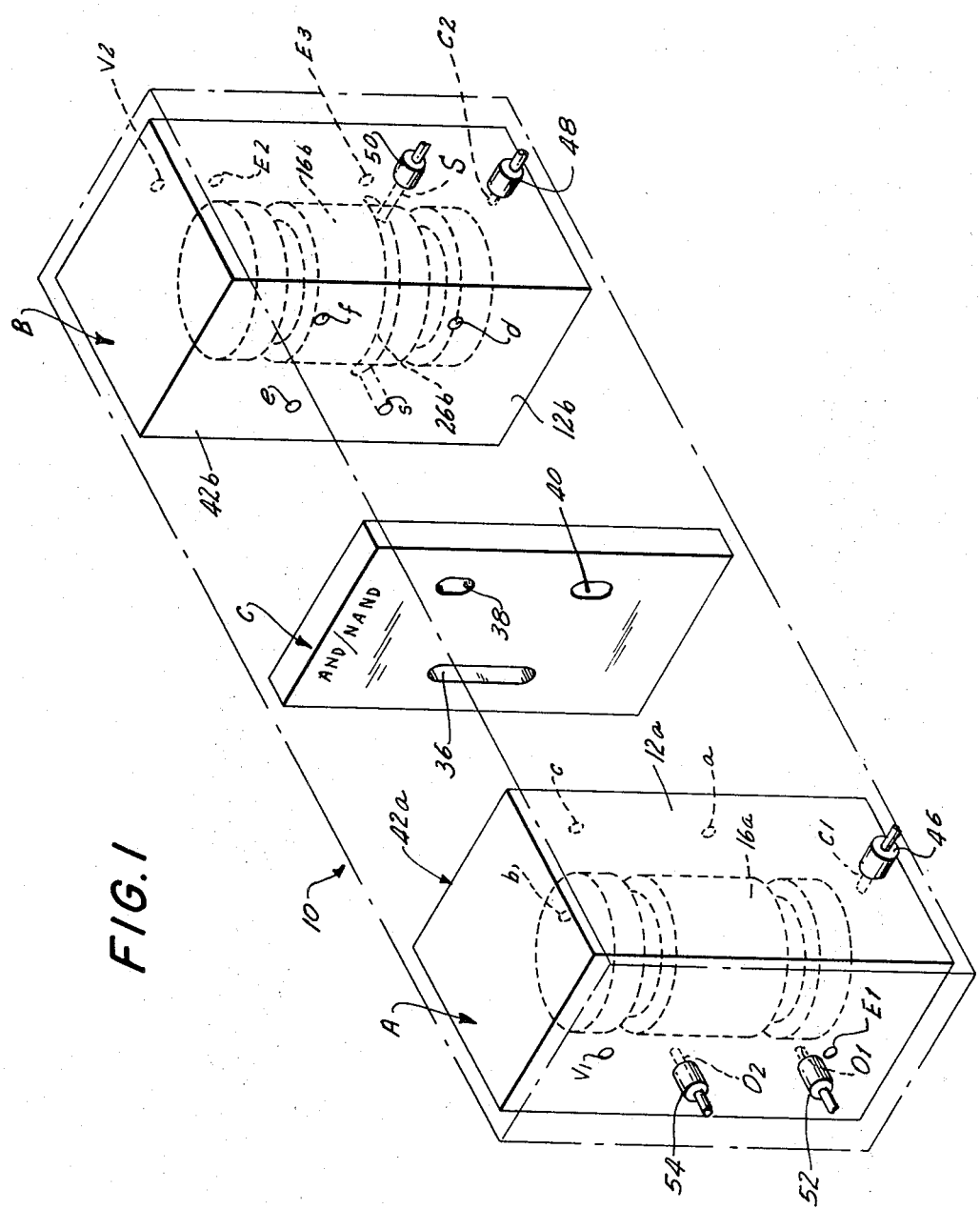
FIG. 1 is an exploded view in perspective of a typical fluid controlled logic module of the present invention.

Broadly described, the present invention provides a fluid controlled logic module comprising a plurality of basically identical valves which may be similarly fabricated to define a valve unit which may, after manufacture, readily be modified for the particular logic function desired. Each valve has a valve member movable within a fluid chamber in that valve upon the presence of a control signal at a valve input port. To operate the module at a desired logic function, defined by the presence or absence of an output signal at an output port, in response to the presence or absence of one or both of the control signals at the input ports of the respective valves, other ports, including at least one intercommunication port, are formed at preselected locations in each of the valve bodies, and a communication member, having passages formed therein at predetermined locations, is interposed between the valves in fluid tight arrangement to effect, through those passages, operative communication between preselected ones of the intercommunication ports. The module may thus be fabricated utilizing standardized components —valves and communication members—which can be readily modified to adapt the module to produce the desired logic function.

A typical fluid controlled logic module of the present invention is illustrated in FIGS. 1—6 in which the location of the ports in the valves and the passages in the communication member are selected to provide the module with the capability of operating as either an AND or a NAND gate depending on the port from which the output signal is obtained. In that module a fluid signal is obtained at one output port and no output is obtained at the other output port only when inputs are present at the input ports of both valves.

The module of FIGS. 1—6 comprises a housing generally designated 10 in which a pair of substantially identical valves A and B are placed and a communication member C is interposed between facing surfaces of these valves. Each valve comprises a valve body 12a and 12b, in which a fluid chamber 14 is centrally formed. A valve member, herein shown in the form of a spool 16a and 16b, is disposed in chamber 14 and is movable from a first or rest position, shown in FIGS. 2—4, in solid lines, to a second or actuated position shown by the broken lines in valve A of FIG. 2, upon the presence of a control signal at input ports C1 and C2 respectively formed in valves A and B. Ports C1 and C2 communicate with the lower end of fluid chamber 14 near the bottom surface of the valve member 16a, b when in its rest position. The valves A and B each further comprise two sets of annular hollow grooves formed in the inner wall of valve body 12a, b which communicate with the fluid chamber 14. As particularly described herein, these grooves are divided into upper and lower sets each comprising three grooves, namely grooves 20, 22 and 24 in the upper set, and grooves 26, 28 and 30 in the lower set. A groove 32 is formed at the upper end of valves bodies 12a, b, and communicates between the upper portion of chamber 14 and the venting ports V1 and V2 of the valves A and B respectively. A groove 34 is formed at the lower end of the valve bodies 12a, b and respectively communicates with the input ports C1 and C2. The grooves 20—34 in valve A are further identified by the suffix a, and those in valve B are further identified by the suffix b. As seen best in FIGS. 2—4, the valve member 16a, b is effective in its two operative positions to effect communication between the central groove (e.g. grooves 22 and 28) of each groove set, and either the upper or lower groove within each of the groove sets, and to prevent communication between the central groove and the other groove in that set. A spring 35 is arranged between the upper surface of valve members 16a, b, and the inner wall of valve bodies 12a, b, and is compressed when the valve member is in its activated position. Spring 35 is effective to return the valve member 16a, b to its rest position when the control signal is removed from the valve input port (C1 or C2).

The valves A and B as thus far described are identical, and hence may be fabricated as a standardized unitary construction, subsequently to be modified, either in the plant or at the place of use, to perform the particular logic function desired. To achieve such a predetermined logic operation of the module, a plurality of ports are selectively formed in each of the valve bodies 12a, b to effect communication between selected ones of the grooves and the exterior of the valve body. This may readily be done by drilling or otherwise forming openings through the valve body to communicate with the selected ones of grooves 20—34. As the annular grooves 20—34 extend about the entire circumferential periphery of the fluid chamber 14, a port may be formed on any of the surfaces of the valve body and at a desired point over a relatively extensive area of that surface, thus providing considerable flexibility in design.

Certain ports will be common to the several specific valve modifications for providing the different logic functions; these will be formed in the valve units as part of their initial manufacture. Other ports will be present or absent, or differently located, from one valve modification to the other; these will be formed in the valve units just prior to their assembly into a module of given logic function. Certain ports will be formed in surfaces of the valve bodies A and B adapted to face outwardly when the valve bodies are assembled into a module; these are the ports which communicate with external elements — vents, exhausts, control and controlled fluid inputs, and controlled fluid outputs. It is often convenient to have the valve input ports C1 and C2 on different faces of the valve bodies from the other external communication ports, and the modules are thus illustrated, but this is not essential. Other ports will be formed in the surfaces 42a and 42b of the valves A and B which face one another; these are the ports which, with the communication member C, provide for intercommunication between the valves A and B. All of the ports are formed to communicate between the exterior of the body and one of the grooves 20—34.

The ports which, in the specific embodiments here disclosed, are common to the standard valve units are the venting port V, communicating with upper groove 32, a first output port O1, communicating with groove 28, a second output port O2 communicating with groove 22 (if only one output is desired, the unused output port may be plugged), and the control input port C1 or C2 communicating with the groove 34.

Ports which must be provided, but the locations of which may vary so that the ports cannot be preformed, are the input port S for the supply or controlled fluid; and, optionally, one or more exhaust ports E.

Thus, in the AND/NAND embodiment of FIGS. 2—6, input port S is formed in valve B to communicate with groove 26b and exhaust ports E2 and E3 are formed to communicate with grooves 20b and 30b respectively. In valve A exhaust port E1 is formed to communicate with groove 30a.

Intercommuication ports a, b and c are formed in the surface 42a of valve A in respective communication with grooves 26a, 24a and 20a, and intercommunication ports d, e and f are formed in the inner surface 42b of valve B in respective communication with grooves 28b, 24b and 22b. In addition, an intercommunication port s is formed to communicate with groove 26b and hence with supply input port S.

The surfaces 42a, 42b through which these intercommunication ports are formed face one another within housing 10 and the communication member C is interposed between these two faces. Communication member C may be in the form of a gasket formed of rubber or other suitable fluid impervious material so that when communication member C is compressed between valves A and B (the compression force being provided by the housing 10), it provides a fluid tight seal between surfaces 42a and 42b except through passages 36, 38 and 40 formed therethrough at selected locations. When valves A and B are placed up against the communication member C, the passages in the communication member effect desired fluid communication between preselected ones of the intercommunication ports in valves A and B.

Figure 2:
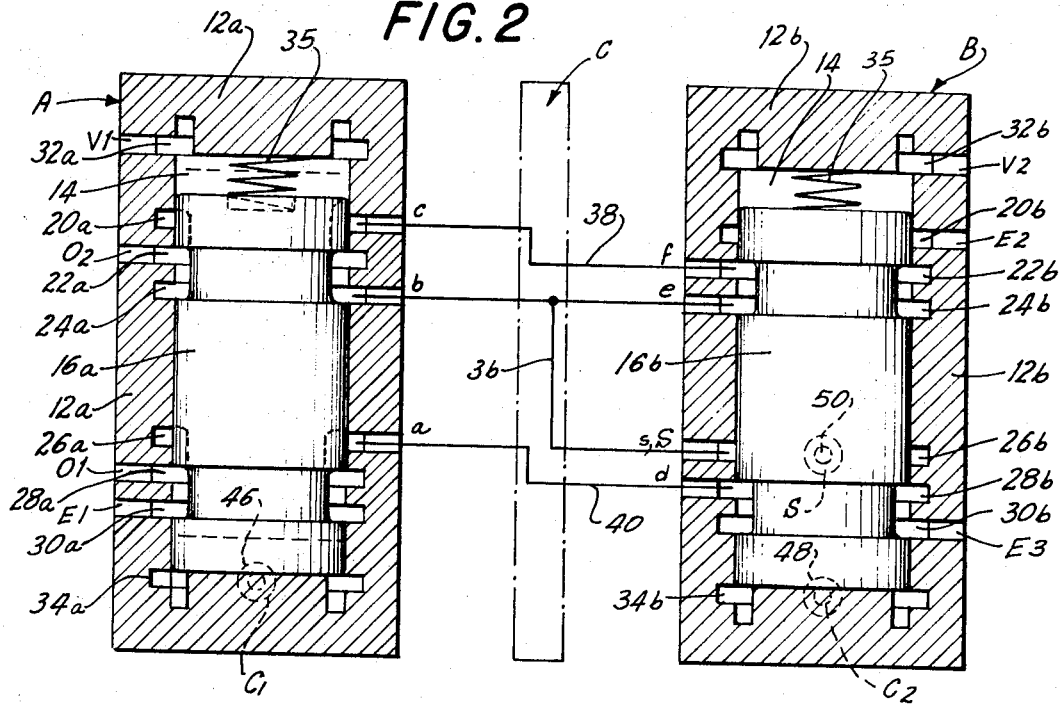
FIG. 2 is a cross-sectional view of the logic module of FIG. 1 indicating schematically the communication paths between the selected ones of the intercommunication ports effected by the communication member interposed between the two valves in order to produce an AND/NAND logic function.
Figure 5:
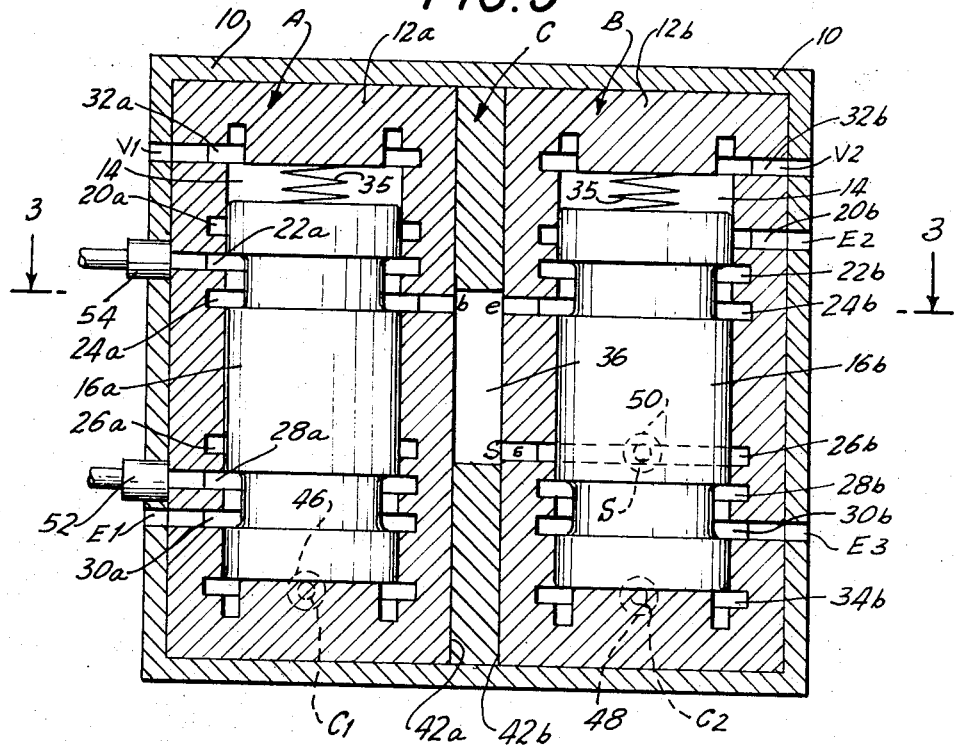
FIG. 5 is a cross-sectional view taken along the line 5—5 of FIG. 3.
Figure 4:
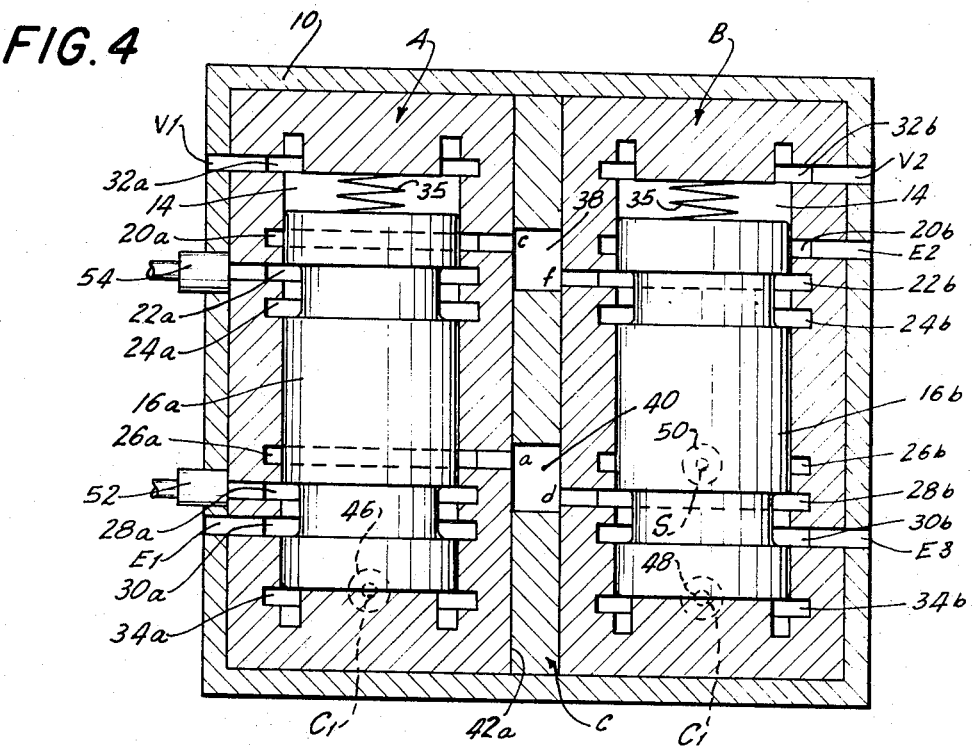
FIG. 4 is a cross-sectional view taken along the line 4—4 of FIG. 3.
Figure 3:
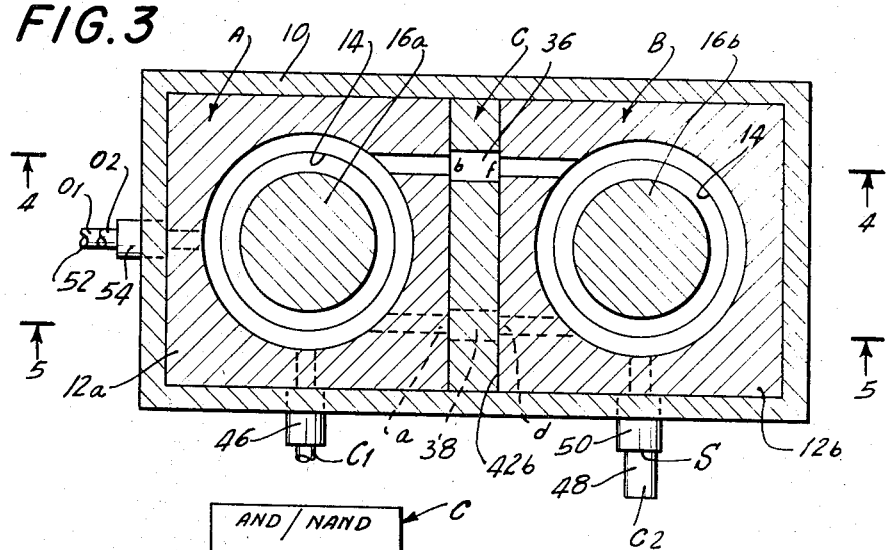
FIG. 3 is a horizontal cross-sectional view of the assembled logic module of FIG. 2.
Figure 6:
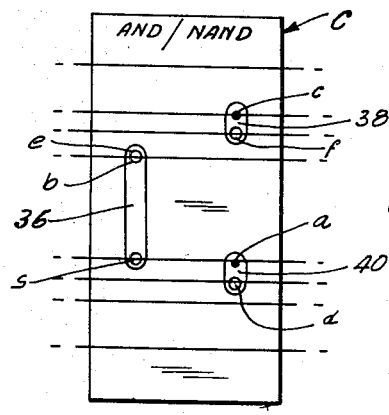
FIG. 6 is a plan view of the communication member utilized in the logic module of FIG. 3.

Communication between any two ports within a given valve will be effected when communication between the grooves with which those ports communicate is effected, the latter being controlled by the position of the valve members 16a, b. Thus, as seen in FIG. 2, the lines drawn between valves A and B represent communication paths between the intercommunication ports a—f and s provided by the passages 36—40 in communication member C. Thus intercommunication port a in valve A communicates through passage 40 with intercommunication port d in valve B; intercommunication port b communicates through passage 36 with both intercommunication port e and intercommunication port s in valve B, and intercommunication port c in valve A communicates through passage 38 with intercommunication port f in valve B. The communication between the intercommunication port s and source port S is constant and independent of the position of valve members 16a, b in either of the valves. In order to provide for non-ambiguous interconnection, the passages 36—40 in the communication member C, and the intercommunication ports with which they respectively cooperate, are provided at appropriate locations, vertical and horizontal, over the available area. This can best be seen from FIG. 6 (and for the other embodiments FIGS. 8, 10 and 12), where, for purposes of illustration, intercommunication ports in valves A and B are represented by dots and circles respectively, the location of the dots and circles in these figures corresponding to the actual physical location of the corresponding intercommunication ports.

Venting ports V1 and exhaust ports E1, E2 and E3 represent the exhaust and vent ports of the module and corresponding openings are formed in housing 10 in registry with these ports as shown in FIG. 1 to allow the fluid from these ports to exhaust from the housing 10. Input ports C1 and C2, which are to receive the control signals, and source port S, which receives a constant source fluid signal, and output ports O1 and O2 each have fittings respectively designated 46, 48, 50, 52 and 54 connected thereto at the outer surface of housing 10 so that a fluid signal may be readily applied or obtained from these ports as desired.

The operation of the fluid logic module of FIGS. 1—6 is as follows: When no control signal is applied to input ports C1 and C2, each valve member 16a, b remains at its rest position. In valve A, this causes grooves 28a and 30a and thus ports O1 and E1 to communicate with one another, and causes grooves 22a and 24a and thus intercommunication port b and output port O2 to communicate with one another. Similarly in valve B when its valve member 16b is in its rest position, grooves 28b and 30b and thus intercommunication port d and exhaust port E3 are in communication with one another, and grooves 24b and 22b and thus intercommunication ports f and e communicate with one another. Valve member 16a in its rest position prevents communication between grooves 28a and 26a (and thus between intercommunication port a and output port O1), and between grooves 20a and 22a (and thus between intercommunication port c and output port O2). Similarly valve member 16b is effective in its rest position to prevent communication between grooves 26b and 28b (and thus between intercommunication port d and source port S), and between grooves 20b and 22b (and thus between intercommunication port f and exhaust port E2).

The source signal applied to source input port S is connected via groove 26b and intercommunication port s through the passage 36 in communication member C to intercommunication port b in valve A and to port e in valve B. Since intercommunication port b is in communication with output port O2, the source signal will appear at the output port O2. Since intercommunication port d is cut off from communication from source port S and port a is cut off from output port O1, no signal will appear at output port O1. Hence with no operative inputs at C1 and C2, there is an output at O2 and there is no output at O1. Port O1 will, however, be connected to exhaust via port E1.

If a control signal is applied at input port C1, valve member 16a will move to its second or actuated position to effect communication between intercommunication port a and output port O1, and between intercommunication port c and output port O2. If there is no control signal at input port C2 at valve B, valve member 16b will remain at its rest position. Thus, the source signal S will now be applied from source port S to intercommunication port e and to intercommunication port f in valve B, and through passage 38 in communication member C to intercommunication port c in valve A, and thus to output port O2, so that a signal will once again appear at output port O2. As intercommunication port d remains cut off from source port S, intercommunication port a in valve A does not receive a source signal so that a signal still does not appear at output port O1. Hence with an operative input at C1, but no operative input at C2, the output of the module remains the same —there is an output at O2 and there is no output at O1. O1 will then be connected to exhaust via intercommunication ports a and d, passage 40, and exhaust port E3.

If a control signal is applied at input port C2 but not at input port C1, the same output situation will remain. The source signal S will get to intercommunication port a but will be blocked from output port O1 by valve member 16a, and that signal will get to output port O2 via intercommunication port s, passage 36, and intercommunication port b. Output port O1 will be connected to exhaust by port E1.

However, when a control signal is applied at input port C2 in valve B as well as at input port C1 in valve A, both of the valve members 16a and 16b will be moved to their second or raised position to effect communication between source port S and intercommunication port d and between intercommunication port f and exhaust port E2. Thus, the source signal will be cut off from intercommunication ports f and c and will not appear at output port O2. Output port O2 will, however, be connected to exhaust port E2 via intercommunication ports c and f and passage 38. The source signal will now be connected from intercommunication port d through passage 40 in communication member C to intercommunication port a in valve A and thus to the output port O1.

Thus, an output signal will appear at output port O1 only when control signals are present at both input ports C1 and C2, and no signal will appear at output port O2 for that condition of the control signals. When a control signal is present at neither or only one of the input ports C1 and C2, there will be no signal at output port O1, but there will be a signal at output port O2. Thus, the output at output port O1 represents an AND logic function of the control signals, and the signal at output port O2 represents a NAND logic function of these control signals.

FIGS. 7 and 8 illustrate a logic module similar to that of FIGS. 1—6 in which the location of the various ports in valves A and B and of the passages in the communication member C have been modified so that the logic module operates as an inclusive OR gate at one output, and as an inclusive NOR gate at its other output.

In valve A, the control signal is applied when present at input port C1 communicating with groove 34a, venting port V1 communicates with groove 32a, and exhaust port E1 communicates with groove 26a. A first output port O1 communicates with groove 28a. Intercommunication ports a1, b1 and c1 are formed through a common surface of valve A and respectively communicate with grooves 30a, 24a and 20a.

In valve B, the control signal is applied, when present, at input port C2 communicating with groove 34b, a venting port V2 communicates with groove 32b, and exhaust ports E2 and E3 respectively communicate with grooves 24b and 26b. Source input port S communicates with groove 20b. Intercommunication ports d1, e1, and f1 and source intercommunication port s1 are formed through a common surface of valve B and communicate respectively with grooves 30b, 28b, 22b and 20b. Passages 56, 58 and 60 are formed in communication member C as shown in FIG. 8.

In the rest positions of valve members 16a and 16b, as shown in FIG. 7, i.e., when no control signal is applied to either of the input ports C1 and C2, grooves 28a and 30a, 22a and 24a and thus, intercommunication port a1 and output port O2 and intercommunication port b1 and output port O1 are in communication with one another. Intercommunication port c1 is cut off from output port O1. In valve B, grooves 28b and 30b, and 22b and 24b, and thus intercommunication ports e1 and d1, and intercommunication ports f1 and exhaust port E2 are in communication with one another. Source intercommunication port s1 and thus source port S is cut off from intercommunication port f1. As shown schematically in FIG. 7, source intercommunication port s1 communicates through passage 56 in communication member C with intercommunication port c1 in valve A, and with intercommunication port d1 in valve B. Intercommunication port f1 communicates through passage 58 in communication member C with intercommunication port b1, and intercommunication port e1 communicates with intercommunication port a1, through passage 60 in member C.

When no control signal is present at either of the input ports C1 and C2, the source signal at source port S is connected through passage 56 to intercommunication port d1, and through the communicating grooves 30b and 28b to intercommunication port e1, from there through passage 60 to intercommunication port a1 in valve A, and then through the communicating grooves 30a and 28a to the output port O2. Thus a signal will appear at output port O2. No signal will appear at output port O1 because the communication between it and intercommunication port c1, which receives the source signal from source intercommunication port s1 through passage 56 in member C, is prevented by valve member 16a. Port O1 is connected to exhaust via intercommunication port b1, passage 58, intercommunication port f1, and exhaust port E2.

When a control signal is present only at input port C1, valve member 16a is urged to its second position to effect communication between intercommunication port c1 and output port O1, and to prevent communication between intercommunication port a1 and output port O2.

When a signal is present only at input port C2 in valve B, valve member 16b is urged to its second position to effect communication between source intercommunication port s1 and source port S and intercommunication port f1, and thus between intercommunication port b1 and output port O1, and to prevent communication between intercommunication port d1 and e1 and thus between source intercommunication port s1, intercommunication port e1 and a1, and output port O2.

When both input ports C1 and C2 receive a control signal, both valve members 16a and 16b are moved to their second positions, the source signal at source input port S will be connected through passage 56 in member C to intercommunication port c1 in valve A, and thus to output port O1. That source signal will not be applied to output port O2 as communication between intercommunication ports e1 and d1 in valve B is prevented by the valve member 16b. Output port O2 will be exhausted via exhaust port E1.

Thus an output signal will appear at output port O1 if there is a control signal applied to either of input ports C1 or C2, and if a control signal is applied to both of these input ports. No signal will appear at output port O1 only if there is no signal at either of the input ports, so that the signal at output port O1 is an inclusive OR logic function of the two control signals.

Conversely, there will be an output signal at output port O2 only if there is no control signal at either control port C1 or C2; no signal will appear at output port O2 if there is a control signal at either or both of the input ports. Thus, the signal appearing at output port O2 is an inclusive NOR function of the control signals.

The logic module illustrated in FIGS. 9 and 10 has its various signal, output and intercommunication ports and communication member passages formed and arranged with respect to one another to produce an exclusive OR logic function of the control signals at one output port and an exclusive NOR logic function of these signals at its other output port.

In valve A input port C1 is again in communication with groove 34a, and venting port V1 communicates with groove 32a. Output ports O1 and O2 respectively communicate with grooves 28a and 22a. Intercommunication ports a2, b2, c2 and d2 are formed through a common surface and respectively communicate with grooves 30a, 26a, 24a and 22a. In valve B, venting port V2 communicates with groove 32b and exhaust ports E1 and E2 respectively communicate with grooves 30b and 20b. Source input port S communicates with groove 26b. Intercommunication ports e2, f2 and g2 and s2 are all formed through a common surface and respectively communicate with grooves 28b, 24b, 22b and 26b.

Intercommunication ports a2, d2 and e2 communicate with one another through passage 62 in communication member C, source intercommunication port s2 and intercommunication port f2 both in valve B are in communication through passage 64 in member C, and intercommunication ports b2, c2 in valve A and g2 in valve B communicate with one another through passage 66 in member C.

When there is no control signal at either input port C1 or C2, valve members 16a and 16b are in their rest positions shown in FIG. 9 so that in valve A grooves 28a and 30a, and 22a and 24a, and thus intercommunication port a2 and output port O1, and intercommunication port c2 and output port O2 are in communication. Communication is prevented between grooves 26a and 28a, and 20a and 22a, and thus there is no communication between intercommunication port b2 and output port O1, and between intercommunication port d2 and output port O2.

Similarly in valve B grooves 22b and 24b and thus intercommunication ports f2 and g2 communicate with one another, and communication is prevented between grooves 26b and 28b, and thus between the source intercommunication port s2 and intercommunication port e2. The source signal is connected from source intercommunication port s2 through passage 64 in member C to intercommunication port f2, and to intercommunication port g2, from there through passage 66 to intercommunication port c2, and from there to output port O2. As source port S is cut off from intercommunication port e2, no signal will appear at intercommunication port a1 and at output port O1.

When a control signal is applied only to input port C1, valve member 16a is raised to its second position, placing grooves 26a and 28a and grooves 20a and 22a, and thus intercommunication ports b2 and d2, in respective communication with output ports O1 and O2. Communication is now prevented between the previously connected intercommunication ports a2 and c2 from these respective output ports. The source signal is now connected from source intercommunication port s2 to intercommunication port g2, through passage 66 to intercommunication port b2 and to output port O1. No source signal is coupled to output port O2 since intercommunication port c2, which receives the source signal, is now cut off from output port O2.

Similarly, when a control signal is applied to only input port C2, valve member 16b is raised to its activated position to effect operative communication between source port S and intercommunication port $e2$, and to prevent operative communication between intercommunication ports $f2$ and $g2$. Source port S is thus in operative communication with output port O1 through intercommunication port $e2$, passage 62, and intercommunication port $a2$. No signal appears at output port O2 as communication between intercommunication ports $f2$ and $g2$ in valve B and thus with intercommunication port $c2$ in valve A is prevented.

When a control signal is applied to both of the input ports, valve members 16a and 16b are each raised to their second positions. The source signal is not connected to output port O1 since communication is prevented by the valve member 16a between intercommunication port $a2$, which receives the source signal, and output port O1. The source signal is, however, connected to output port O2 from source port S through intercommunication port $e2$, passage 62, and intercommunication port $d2$ and thus to output port O2 in valve A.

Thus there will be an output signal at output port O1 only if there is a control signal applied to either input port C1 or input port C2. There will be no signal at output port O1 when a control signal is applied to both input ports, and when neither input ports receives a control signal. The signal appearing at output port O1 is thus an exclusive OR function of the two control signals.

A signal will appear at output port O2 when both input ports receive a control signal and when neither of the input ports receives a control signal. No signal will appear at output port O2 only if there is a control signal applied to only one of the input ports C1 or C2. The signal at output port O2 is thus an exclusive NOR logic function of the control signals.

The logic module illustrated in FIGS. 11 and 12 provides an output at a single output port O which may be defined as a preferential flip-flop having a starting state output "on". In valve A venting port V1 communicates with groove 32a and an exhaust port E1 communicates with groove 20a. The single output port O communicates with groove 22a and a first source port S1 receiving a constant source signal communicates with groove 24a. The control signal is applied when present through a check valve 68 to input port C1 which communicates with groove 34a.

In valve B venting port V2 communicates with groove 32b, exhaust port E2 communicates with groove 26b, input port C2, receiving a second control signal when present, communicates with groove 34b, and a second source port S2, also receiving the fluid source signal, communicates with groove 30b.

Intercommunication ports $a3$, $b3$, and $c3$ are formed through a common surface of valve A and communicate respectively with grooves 34a, 28a and 26a. It will be noted that intercommunication port $a3$ communicates with the same groove as does the input port C1, so that the presence of the source signal at intercommunication port $a3$ has the equivalent effect on valve member 16a as would the presence of the control signal thereat, that is, valve member 16a will be raised to its actuated position. An intercommunication port $d3$ communicating at its inner end with groove 28b is formed on valve B.

Communication member C is provided with longitudinal passages 70 and 72 as shown in FIG. 12, and is interposed between the facing surfaces of valves A and B through which the intercommunication ports are formed so that intercommunication ports $a3$ and $b3$ in valve A are in communication with one another through passage 70, and intercommunication ports $c3$ and $d3$ are in communication through passage 72. It will be noted that no port is formed in valve A to communicate with groove 30a, and no ports are formed in valve B to communicate with grooves 20b, 22b and 24b.

When no control signal is applied to either of the input ports C1 and C2, valve member 16 effects communication between grooves 22a and 24a so that the source signal will be coupled from source port S1 to output port O. When a control signal is applied at input port C1, valve member 16a is raised to its actuated position and communication between grooves 22a and 24a, and thus between source port S1 and output port O, is prevented. Groove 26a communicates with groove 28a so that intercommunication port $c3$ now communicates with intercommunication port $b3$ and thus with intercommunication port $a3$ to couple the source signal (applied to intercommunication port $c3$ from source port S2 and intercommunication port $d3$ in valve B, and then through passage 72 in member C) to intercommunication port $a3$. The source signal at intercommunication port $a3$ is thus effective to latch valve member 16a in its actuated position even when the control signal at input port C1 is removed. Consequently, there will be no output signal at output port O after a control signal is applied and then removed from input port C1. Check valve 68 prevents the source signal at intercommunication port $a3$ from leaving the valve A through input port C1.

That condition at output port O will remain until a control signal is applied at input port C2. Such a C2 control signal causes valve member 16b to be moved to its actuated position to prevent communication between grooves 28b and 30b, and thus between source port S2 and intercommunication port $d3$. The source signal is thus removed from intercommunication port $c3$ and thus from intercommunication port $a3$ to cause valve member 16a to be returned by spring 35 to its first or rest position so as to prevent operative communication between source port S1 and output port O, so that at this time no output signal will be obtained at output port O.

When the control signal is removed from input port C2, valve member 16b will be returned to its rest position. However, as there is no operative communication between source port S2 and intercommunication port $a3$, valve member 16a will remain in its rest position, and there will continue to be an output signal at output port O, until the subsequent application of a control signal at input port C1, which once again raises valve member 16a to its second position to remove the signal from output port O as described above.

The logic module of FIG. 11 is thus a flip-flop or binary stage. If the supply of the source signal to source ports S1 and S2 is interrupted, the module will return to its starting condition at which an output signal is obtained at output port O when the supply of the source signal is resumed, irrespective of the signal condition at the output port at the time the source signal is interrupted. Thus if valve member 16a is in its first position to effect communication between source port S1 and output port O, the interruption of the source signal will result in the absence of a signal at output port O and the resumption of the source signal will restore a signal at output port O. If valve member 16a is being retained or latched in its second position as a result of the source signal being applied at intercommunication port $a3$ when the source signal is interrupted, the latching signal is removed, and valve member 16a will return to its first position. The resumption of the source signal will be effective to once again provide an output signal at output port O, and since valve member 16a in its first position prevents communication between intercommunication ports $b3$ and $c3$ and thus between source port S2 and intercommunication port $a3$, the resumption of the source signal has no effect on the position of valve member 16a. The module may thus be considered as being a preferential "On" flip-flop—upon the resumption of the source signal after an interruption of that signal, the output signal is always present at the output port, corresponding to an "on" condition of the module.

The flip-flop module of FIGS. 11 and 12 may readily be modified to operate as a preferential "off" flip-flop by reversing the relative positions of source port S1 and E1 in valve A. (This involves no physical change in the module, but only a change in the external connections thereto.) For a preferential output "off" flip-flop, port E1 would communicate with groove 24a, and source port S1 would communicate with groove 20a. The operation of that module would be similar to operation of the preferential "on" flip-flop of FIGS. 11 and 12, except that for the same conditions of the control signals at input ports C1 and C2, the signal condition at output port O would be the reverse of that obtained in the module of FIGS. 11 and 12. Moreover, when the supply of signal fluid is interrupted and then resumed, there will be no output signal at output port O irrespective of the condition of the control signals at the time the source signal is interrupted. That module thus corresponds to a preferential output state "off" flip-flop.

To simplify the modification of the standardized valves to perform a specific logic function e.g. AND/NAND, identifying indicia may be provided on the upper portion of the communication member C as shown in FIGS. 6, 8, 10 and 12, and the passages in that member may be formed by punching out pre-scored segments of that member corresponding to the location and configuration of the member passages for that logic function. Those removable segments may have indicia in the form of dark dots and circles, as shown here, in FIGS. 6, 8, 10 and 12 for schematic illustrative purposes, to apprise the workman as to the particular valve and the location at that valve at which an intercommunication port is to be formed. The dot directs the workman to form the port in the left valve, i.e. valve A at the location of that dot, and the larger circle indicates that a port is to be formed in the right valve, i.e. valve B at the location of that circle.

A logic module has been described which comprises a pair of originally identical valves and a communication member all of which are readily modified in a specified manner to obtain a module capable of performing a specified logic function for control signals respectively applied to each valve. Fabrication of the desired logic module from the standard module components is readily accomplished by workers having limited skill. The unmodified module contains relatively inexpensive components and can thus be fabricated and sold in large quantities at relatively low prices. The customer may purchase a quantity of the standard valves along with a suitable supply of the pre-scored communication members identified by their respective logic function. The valves can be readily modified to meet the purchaser's specific requirements as they arise. The logic module thus has great flexibility in its possible applications and provides a useful and practical device for use in systems in which fluid logic control is employed.

While the modules as shown contain two similar valves, it will be apparent that other such valves, or even dissimilar valves, could be operatively associated in a module with said two valves. Moreover, the source of the control signal can vary widely, and could, for example, be the output of an internal valve or module, or in some instances could be internally derived from the module itself.

While several embodiments of this invention have been herein specifically disclosed, it will be apparent that variations may be made thereto without departing from the spirit and scope of the invention as defined in the following claims.

I claim:

1. A fluid controlled logic module comprising: a housing, first and second substantially similar valves in said housing, each of said valves comprising a valve body having a fluid chamber, an input port formed in said body and communicating with said chamber for receiving a control signal, and a plurality of ports selectively formed in said body and communicating at their inner ends with said chamber, one of said ports in one of said valves defining a source port for receiving a source signal, another of said ports in one of said valves defining an output port, and at least one of said ports in each of said valves defining an intercommunication port, and a valve member in said chamber and movable upon the presence or absence of an operative control signal at said input port between first and second positions to respectively effect selective communication between different ones of said ports in each of its said positions; said module further comprising a communication member interposed between and in fluid tight arrangement with said first and second valve bodies and having passage means therein in communication with selected ones of said intercommunication ports to effect selective communication therebetween, thereby to control the operative communication between said source port and said output port in response to the respective positions of said valve members and thus to the presence or absence of a control signal at said input ports.

2. A fluid controlled logic module as defined in claim 1, in which said communication member passage means is in communication with first and second intercommunication ports in one of said valves and effective to place said first and second intercommunication ports in fluid communication with one another.

3. A fluid controlled logic module as defined in claim 2, in which said communication member passage means is in communication with one of said intercommunication ports in said first valve and one of said intercommunication ports in said second valve, and effective to place said ones of said intercommunication ports in operative communication with one another.

4. A fluid controlled logic module as defined in claim 3, in which first and second output ports are provided in said first valve, said source port being provided in one of said valves, said communication member being effective to effect alternate operative communication between said source port and one or the other of said first and second output ports dependent on the presence or absence of control signals at said input ports.

5. A fluid controlled logic module as defined in claim 1, in which said valves each comprise an inner surface facing the other of said valves, and an outer surface not facing the other of said valves, said intercommunication ports opening at said inner surface, and said input, output, and source ports terminating at said outer surface.

6. A fluid controlled logic module as defined in claim 5, in which first and second output ports are provided in said first valve, said source port being provided in one of said valves, said communication member being effective to effect alternate operative communication between said source port and one or the other of said first and second output ports dependent on the presence or absence of control signals at said input ports.

7. A fluid controlled logic module as defined in claim 5, said communication member being operatively interposed between said facing inner surfaces of said valves.

8. A fluid controlled logic module as defined in claim 7, in which first and second output ports are provided in said first valve, said source port being provided in one of said valves, said communication member being effective to effect alternate operative communication between said source port and one or the other of said first and second output ports dependent on the presence or absence of control signals at said input ports.

9. A fluid controlled logic module as defined in claim 1, in which first and second output ports are provided in said first valve, said source port being provided in one of said valves, said communication member being effective to effect alternate operative communication between said source port and one or the other of said first and second output ports dependent on the presence or absence of control signals at said input ports.

10. The fluid controlled logic module of claim 9, each of said valves having two sets of three grooves in communication with said chamber, said valve member being effective in its said first and second positions to effect communication between the central one of said three grooves and only one of the upper and lower of said three grooves, said source, output and intercommunication ports each communicating between the outer surface of said valve bodies and a selected one of said grooves, said input port communicating with said chamber at the end of said valve member.

11. A fluid controlled logic module as defined in claim 1, in which first, second and third intercommunication ports and first and second output ports are provided in said first valve, said valve member in said first valve being effective when in its first and second positions respectively: (A) to prevent and effect operative communication between (1) said first intercommunication port and said first output port and (2) between said third intercommunication port and said second output port; and (B) to effect and prevent operative communication between said second intercommunication port and said second output port; said second valve having fourth, fifth and sixth intercommunication ports respectively communicating through said communication member to said first, second and third intercommunication ports, said second valve also having a source port, said fifth intercommunication port also communicating through said communication member with said source port, said valve member in said second valve being effective in its said first and second positions respectively: (A) to prevent and effect operative communication between said source port and said fourth intercommunication port, and (B) to effect and prevent operative communication between said fifth and sixth intercommunication ports.

12. A fluid controlled logic module as defined in claim 1, in which first, second, third and fourth intercommunication ports and first and second output ports are provided in said first valve, fifth, sixth and seventh intercommunication ports and a supply port being provided in said second valve, said second, third and seventh intercommunication ports, said first, fourth and fifth intercommunication ports, and said sixth intercommunication port and said source port being respectively in fluid communication with one another through said communication member, said valve member in said first valve in its said first and second positions being effective respectively: (A) to effect and prevent operative communication between (1) said first intercommunication port and said first output port, and (2) said third intercommunication port and said second output port, and (B) to prevent and effect operative communication between (1) said second intercommunication port and said first output port and (2) said fourth intercommunication port and said second output port; said valve member in said second valve in its said first and second positions being effective respectively: (A) to effect and prevent operative communication between said sixth and seventh intercommunication ports and (B) to prevent and effect operative communication between said fifth intercommunication port and said source port.

13. A fluid controlled logic module as defined in claim 1, in which first, second and third intercommunication ports and first and second output ports are provided in said first valve, and fourth, fifth and sixth intercommunication ports and a supply port are provided in said second valve, said first and fifth, said second and sixth, and said third and fourth intercommunication ports and said source port being in operative communication through said communication member, said valve member in said first valve in its said first and second positions being effective respectively: (A) to effect and prevent operative communication between (1) said first intercommunication port and said second output port, and (2) between said second intercommunication port and said first output port, and (B) to prevent and effect operative communication between (1) said third intercommunication port and said first output port; said valve member in said second valve being effective in its said first and second positions respectively: (A) to effect and prevent operative communication between (1) said fourth and fifth intercommunication ports, and (2) to prevent and effect operative communication between said sixth intercommunication port and said source port.

14. A fluid controlled logic module as defined in claim 1, in which a first source port, first and second intercommunication ports, and a third intercommunication port defining a valve member actuating port are provided in said first valve, and a second source port and a fourth intercommunication port are provided in said second valve, said communication member effecting communication between said first and fourth intercommunication ports and between said second and third intercommunication ports, said valve member in said first valve being effective in its first and second positions respectively: (A) to effect and prevent operative communication between (1) said output port and said first source port and (2) to prevent and effect operative communication between said first and second intercommunication ports; said valve member in said second valve in its first and second positions being effective respectively: (B) to effect and prevent operative communication between said second source port and said fourth intercommunication port, and thus between said second source port and said first intercommunication port in said first valve.

15. A fluid controlled logic module as defined in claim 1, in which a first source port, first and second intercommunication ports and a third intercommunication port defining a valve member actuating port are provided in said first valve, and a second source port and a fourth intercommunication port are provided in said second valve, said communication member effecting communication between said first and fourth intercommunication ports and between said second and third intercommunication ports, said valve member in said first valve being effective in its first and second positions respectively: (A) to prevent and effect operative communication between (1) said output port and said first source port and (2) to prevent and effect operative communication between said first and second intercommunication ports; said valve member in said second valve in its first and second positions being effective respectively: (B) to effect and prevent operative communication between said second source port and said fourth intercommunication port, and thus between said second source port and said first intercommunication port in said first valve.

16. The fluid controlled logic module of claim 1, each of said valves having two sets of three grooves in communication with said chamber, said valve member being effective in its said first and second positions to effect communication between the central one of said three grooves and only one of the upper and lower of said three grooves, said source, output and intercommunication ports each communicating between the outer surface of said valve bodies and a selected one of said grooves, said input port communicating with said chamber at the end of said valve member.

17. The fluid controlled logic module of claim 16, in which said valve bodies each have facing inner surfaces, said intercommunication ports being on, and said intercommunication member being interposed between, said facing inner surfaces.

18. The fluid controlled logic module of claim 16, in which said intercommunication port on one of said valve bodies is at a relative position on the periphery of said valve body corresponding to the position of the intercommunication port on the valve body of said other of said valves with which it is to be placed in fluid communication by said communication member.

19. The fluid controlled logic module of claim 18, in which said valve bodies each have facing inner surfaces, said intercommunication ports being on, and said intercommunication member being interposed between, said facing inner surfaces.